United States Patent
Chiu et al.

(10) Patent No.: US 10,647,171 B2
(45) Date of Patent: May 12, 2020

(54) STRUCTURE AND APPARATUS FOR TIRE PRESSURE MONITORING

(71) Applicant: KEYCORE TECHNOLOGY CORP., Zhubei, Hsinchu County (TW)

(72) Inventors: Po-Wei Chiu, Zhubei (TW);
Wei-Cheng Lin, Zhubei (TW);
Shih-Hsiu Tseng, Zhubei (TW);
Chien-Jen Hsiao, Zhubei (TW)

(73) Assignee: Keycore Technology Corp., Zhubei, Hsinchu County (TW)

( * ) Notice: Subject to any disclaimer, the term of this patent is extended or adjusted under 35 U.S.C. 154(b) by 61 days.

(21) Appl. No.: 16/127,215

(22) Filed: Sep. 10, 2018

(65) Prior Publication Data

US 2020/0079160 A1  Mar. 12, 2020

(51) Int. Cl.
*B60C 23/04* (2006.01)
*H01Q 1/22* (2006.01)

(52) U.S. Cl.
CPC ........ *B60C 23/0464* (2013.01); *B60C 23/041* (2013.01); *B60C 23/0452* (2013.01); *B60C 23/0461* (2013.01); *B60C 23/0474* (2013.01); *H01Q 1/2241* (2013.01)

(58) Field of Classification Search
CPC ..... B60C 23/02; B60C 23/04; B60C 23/0464; B60C 23/041; B60C 23/0435; B60C 23/0447; B60C 23/0452; B60C 23/0455; H01Q 1/2241
See application file for complete search history.

(56) References Cited

U.S. PATENT DOCUMENTS

2017/0001483 A1\* 1/2017 Sabatini ............... H05K 5/0026

\* cited by examiner

*Primary Examiner* — Curtis B Odom
(74) *Attorney, Agent, or Firm* — Thomas J. Nikolai; DeWitt LLP (57) ABSTRACT

An apparatus for tire pressure monitoring comprises a case, a gas nozzle unit movably connected to the outside of the case, and a structure for tire pressure monitoring which is received in a receiving space in the case. The structure for tire pressure monitoring comprises a main body, a signal processing unit, a sensing unit connected to the signal processing unit, and a power unit to provide power. The main body has a first part and a second part. The first part is disposed on a top side of the second part; the first and the second parts are not on the same plane. The signal processing unit and the sensing unit are disposed on one side of the first part and on the top side of the second part, respectively. The power unit is disposed on a bottom side of the second part.

12 Claims, 8 Drawing Sheets

STRUCTURE AND APPARATUS FOR TIRE PRESSURE MONITORING

BACKGROUND OF THE INVENTION

Field of the Invention

The present invention relates to a structure and an apparatus for tire pressure monitoring and, in particular, to a structure and an apparatus for tire pressure monitoring, which can prevent the interference in the emitted wireless signal and save space.

Description of Prior Art

According to the statistical data, over 70 percent of the car accidents on the highway are caused by tire blowouts, but less than 10 percent of the drivers have the habit of checking the tire condition spontaneously. From the above data, abnormality of the car tire is always regarded as the most difficult issue that the drivers can prevent. Thus, the vendors develop an apparatus for tire pressure monitor to detect the tire condition constantly and remind the drivers to prevent the accident immediately when the abnormal tire condition occurs.

As for the prior art apparatus for tire pressure monitoring which is installed on the wheel frame, it comprises a case, a circuit board, a tire pressure sensor, an emitting antenna, a processing unit, and a battery providing power. The bottom of the case is attached on the bottom of the interior of the wheel frame. The circuit board like the PCB is received on the bottom side of the interior of the case. The emitting antenna, the processing unit, and the tire pressure sensor are all soldered on one side of a large circuit board. The processing unit is electrically connected to the emitting antenna and the tire pressure sensor which are disposed on the same plane of a side corresponding to the circuit board. The battery is disposed on the bottom side of the interior of the case and adjacent to the circuit board. The battery and the circuit board are on the same plane corresponding to the bottom side of the case.

Although the prior art apparatus for tire pressure monitoring is installed on the wheel frame of the car for monitoring the tire pressure, such a configuration causes another problem which is the emitting antenna and the tire sensor on the circuit board in the prior art apparatus are directional. The emitting antenna and the tire sensor both disposed on the circuit board are on the same plane such that the installations of the tire sensor and the emitting antenna are specifically directional, which results in the problem of an unadjustable relative angle between the emitting antenna and the wheel frame due to the directionality of the tire sensor and further suffers from unstable and poor signal reception quality. Also, because of the placements of the circuit board and the battery are on the same plane, the case requires more space to accommodate the battery, which causes the battery to occupy space. To solve the problem of the battery occupation, other vendors stack the batteries on the back plate of the circuit board to save space; however, this configuration will cause the battery to interfere with the emitting antenna disposed on the front side of the circuit board to disturb the wireless signal sent by the emitting antenna. As a result, the problems of poor wireless signal quality and unstable signal reception quality occur.

Moreover, the prior art apparatus disposes the above-mentioned emitting antenna, the processing unit, the tire sensor, and the battery on the same side of a large circuit board. Due to different weights of the components (including the emitting antenna, the processing unit, the tire sensor, and the battery) and the centers of gravity of the components disposed on different positions on the same side of the circuit board, the disposition of the components on the circuit board causes imbalance such that the unbalanced weight of the apparatus for tire pressure monitoring occurs. As a result, the noise problem caused during the operation of the apparatus for tire pressure monitoring installed on the wheel frame due to the unbalanced weight is generated.

SUMMARY OF THE INVENTION

An objective of the present invention is to provide a structure and an apparatus for tire pressure monitoring, which prevent the interference in the emitted wireless signal and save space.

Another objective of the present invention is to provide a structure and an apparatus for tire pressure monitoring, which effectively achieve the effect of stable signal reception quality by means of the first circuit board and the second circuit board being disposed separately and vertically to each other and the power unit being stacked with the second circuit board of the second part.

Yet another objective of the present invention is to provide a structure and an apparatus for tire pressure monitoring, which effectively prevents the noise generation.

To achieve the above objectives, the present invention provides a structure for tire pressure monitoring, which comprises a main body, a signal processing unit, a sensing unit, and a power unit. The main body has a first part and a second part. The first part is disposed on a top side of the second part; the first part and the second part are not on the same plane. The signal processing unit is disposed at one side of the first part of the main body. The signal processing unit is provided with a wireless emitter, a processing unit connected to the wireless emitter, and a first circuit board. The wireless emitter and the processing unit are disposed on one side of the first circuit board. The sensing unit is disposed on the top side of the second part of the main body. The sensing unit is provided with at least one sensor and a second circuit board. The at least one sensor is disposed on one side of the second circuit board and connected to the processing unit disposed on the first circuit board. The power unit is disposed on a bottom side of the second part corresponding to the sensing unit; the power unit is connected to the signal processing unit and the sensing unit to provide power. By means of the design of the structure of the present invention, the interference in the emitted wireless signal can be prevented effectively and the occupied space can be saved.

The present invention also provides an apparatus for tire pressure monitoring, which comprises a case, a gas nozzle unit, and a structure for tire pressure monitoring. The case has a receiving space and a connecting part; the connecting part is disposed on an outside of the case. The gas nozzle unit has one end thereof movably connected to the connecting part. The structure for tire pressure monitoring which is disposed in the receiving space comprises a main body, a signal processing unit, a sensing unit, and a power unit. The main body has a first part and a second part. The first part is disposed on a top side of the second part; the first part and the second part are not on the same plane. The signal processing unit is disposed at one side of the first part of the main body. The signal processing unit is provided with a wireless emitter, a processing unit connected to the wireless emitter, and a first circuit board. The wireless emitter and the processing unit are disposed on one side of the first circuit board. The sensing unit is disposed on the top side of the second part of the main body. The sensing unit is provided with at least one sensor and a second circuit board. The at least one sensor is disposed on one side of the second circuit board and connected to the processing unit disposed on the first circuit board. The power unit is disposed on a bottom side of the second part corresponding to the sensing unit; the power unit is connected to the signal processing unit and the sensing unit to provide power. By means of the design of the apparatus of the present invention, the interference in the emitted wireless signal can be prevented effectively and the occupied space can be saved.

DETAILED DESCRIPTION OF THE INVENTION

The above objectives of the present invention and the features of structure and function of the present invention are described according to preferred embodiments in accompanying figures.

The present invention relates to a structure and an apparatus for tire pressure monitoring. Please refer to FIG. 1A which is a perspective assembled view of the structure for tire pressure monitoring according to an embodiment of the present invention, FIG. 1B which is a local perspective cross-sectional view of the structure for tire pressure monitoring according to an embodiment of the present invention, FIG. 2 which is a block diagram of the structure for tire pressure monitoring according to an embodiment of the present invention, FIG. 3 which is a perspective assembled view of the apparatus for tire pressure monitoring according to an embodiment of the present invention, FIG. 3A which is a perspective exploded view of the apparatus for tire pressure monitoring according to an embodiment of the present invention, FIG. 3B which is another perspective exploded view of the apparatus for tire pressure monitoring according to an embodiment of the present invention, FIG. 4A which is a schematic view of an embodiment of the present invention in practice, and FIG. 4B which is a local enlarged view of FIG. 4A. The apparatus 2 for tire pressure monitoring is installed on the wheel frame 4 of a car tire (not shown) and used to monitor the current tire pressure value (or the tire pressure value and the tire temperature value) of the car tire. The apparatus 2 for tire pressure monitoring comprises a case 21, a gas nozzle unit 23, and a structure 1 for tire pressure monitoring. The case 21 has a receiving space 213, a connecting part 214, a top cover 211, and a base 212. The top cover 211 is combined with the base 212; the top cover 211 and the base 212 together define the receiving space 213. The connecting part 214 is disposed on an outside of the case 21. The connecting part 214 has two lugs 2141 opposite to each other. The two lugs 2141 are formed on the outside of the top cover 211 of the case 21. Each of the two lugs 2141 has a throughhole 2142. One end of the gas nozzle unit 23 is movably connected to the connecting part 214. In the current embodiment the connection between the gas nozzle unit 23 and the connecting part 214 of the case 21 is in a pivoted way. The gas nozzle unit 23 has a joining part 231 disposed between the two lugs 2141 and a nozzle mouth 232. The nozzle mouth 232 is disposed in the other end of the gas nozzle unit 23 to inflate the car tire with air. One end of the gas nozzle unit 23 protrudes outwards to form the joining part 231. The joining part 231 is provided with an opening 2311 corresponding to the throughholes 2142 and is disposed by means of a pivot pin 3 passing through the throughholes 2142 and the opening 2311 such that the gas nozzle unit 23 and the case 21 can be adjusted with respect to each other. For example, the case 21 can move up by 20 degrees by means of the pivot pin 3 pivoted on one end the gas nozzle unit 23 or one end of the gas nozzle unit 23 can be adjusted to move down by 30 degrees by means of the pivot pin 3 pivoted on the case 21. In this way, an appropriate angle adjustment can be made according the specifications of the wheel frame 4.

Figure 1A:
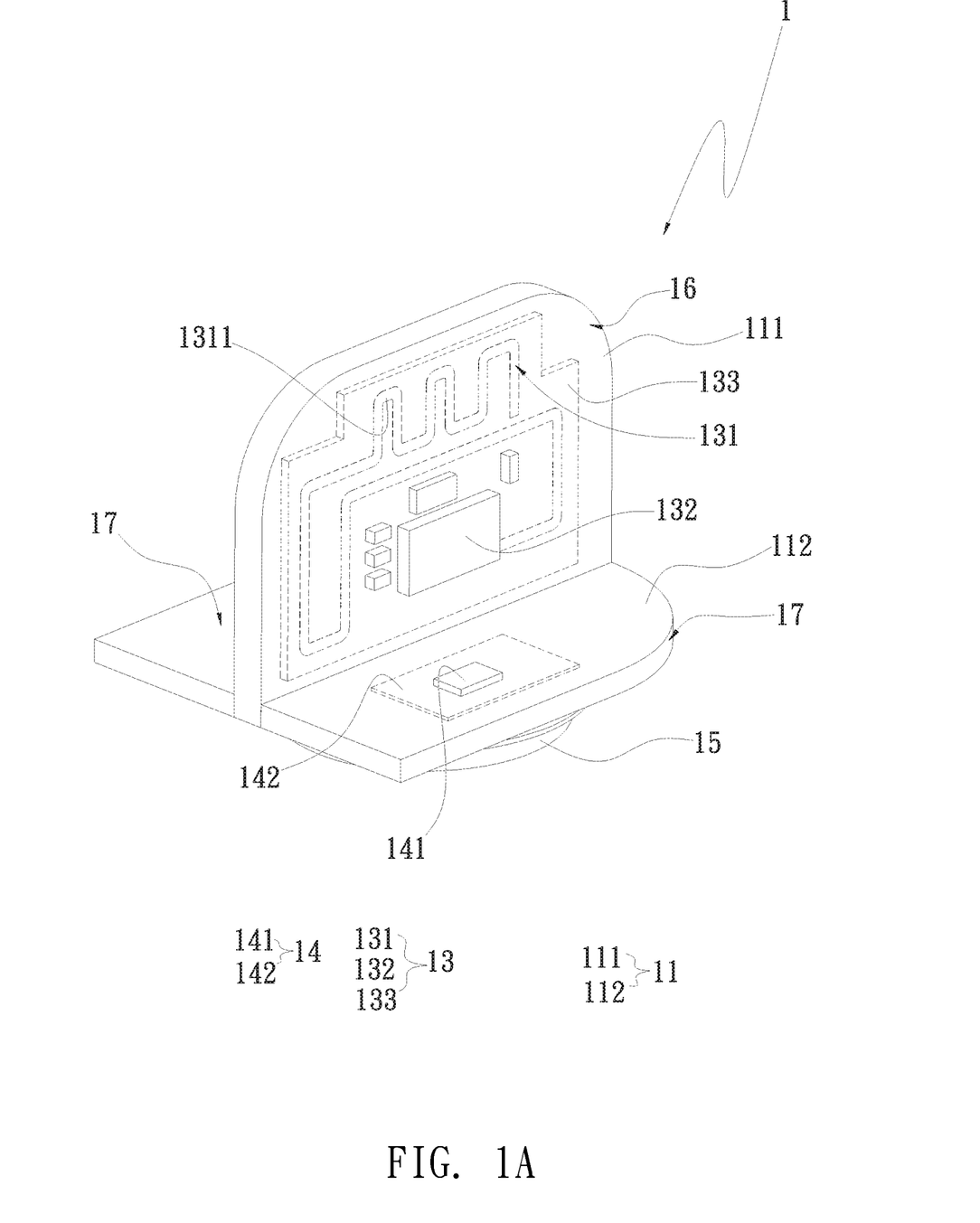
FIG. 1A is a perspective assembled view of the structure for tire pressure monitoring according to an embodiment of the present invention.
Figure 1B:
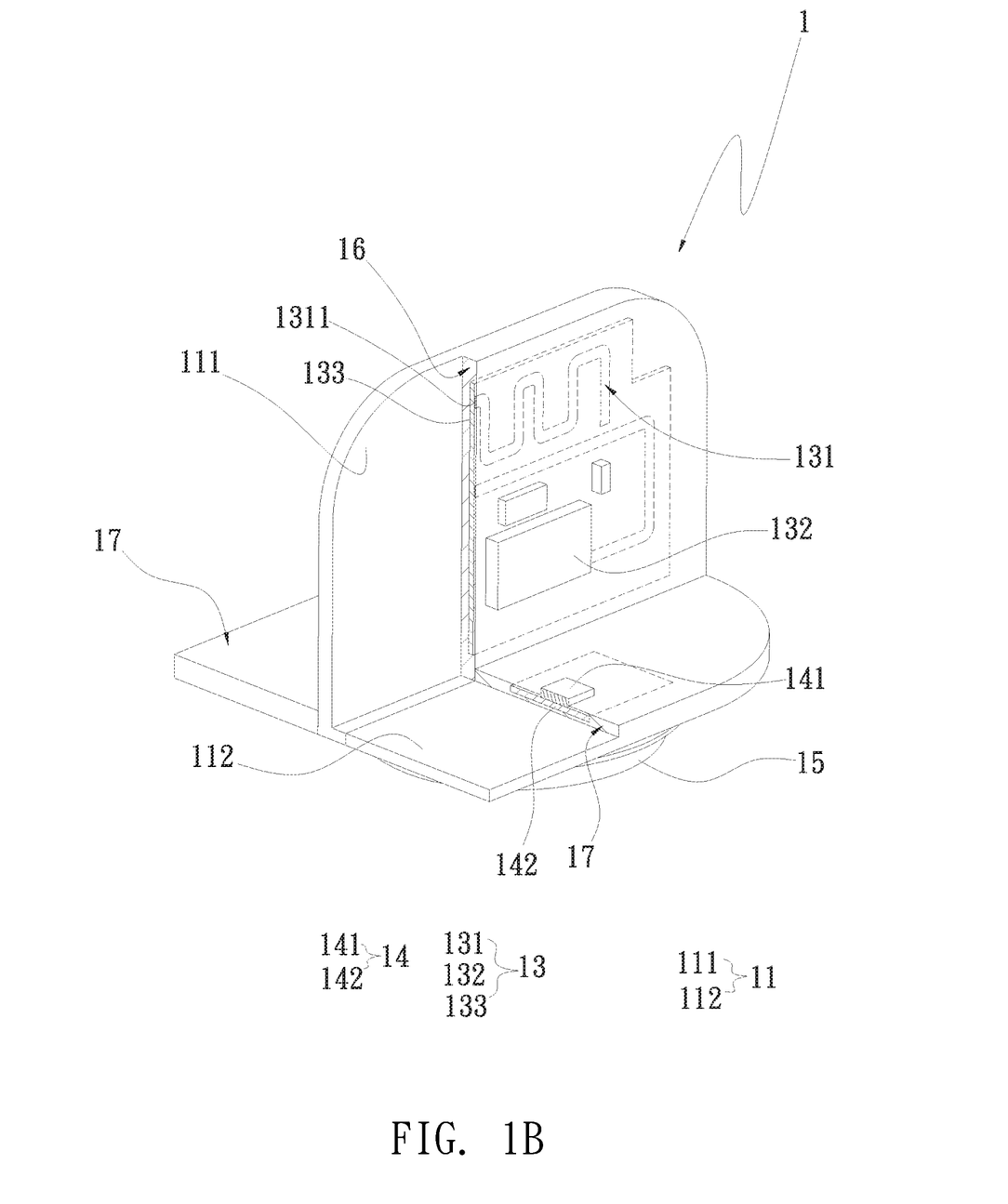
FIG. 1B is a local perspective cross-sectional view of the structure for tire pressure monitoring according to an embodiment of the present invention.

Also, the structure 1 for tire pressure monitoring is disposed in the receiving space 213 of the case 21. The structure 1 for tire pressure monitoring comprises a main body 11, a signal processing unit 13, a sensing unit 14, and a power unit 15 corresponding to the sensing unit 14. The main body 11 has a first part 111 and a second part 112. The first part 111 is disposed on an upper side of the second part 112. The first part 111 and the second part 112 are not on the same plane. In the current embodiment, the first part 111 is disposed vertically at the center of the upper side of the second part 112 and the first part 111 is disposed vertically at the center of gravity of the second part 112 of the main body 11. In an alternative embodiment, the first part 111 can be formed by the upper side, the bottom side, or the side of the second part 112 tilting outwards.

Figure 2:
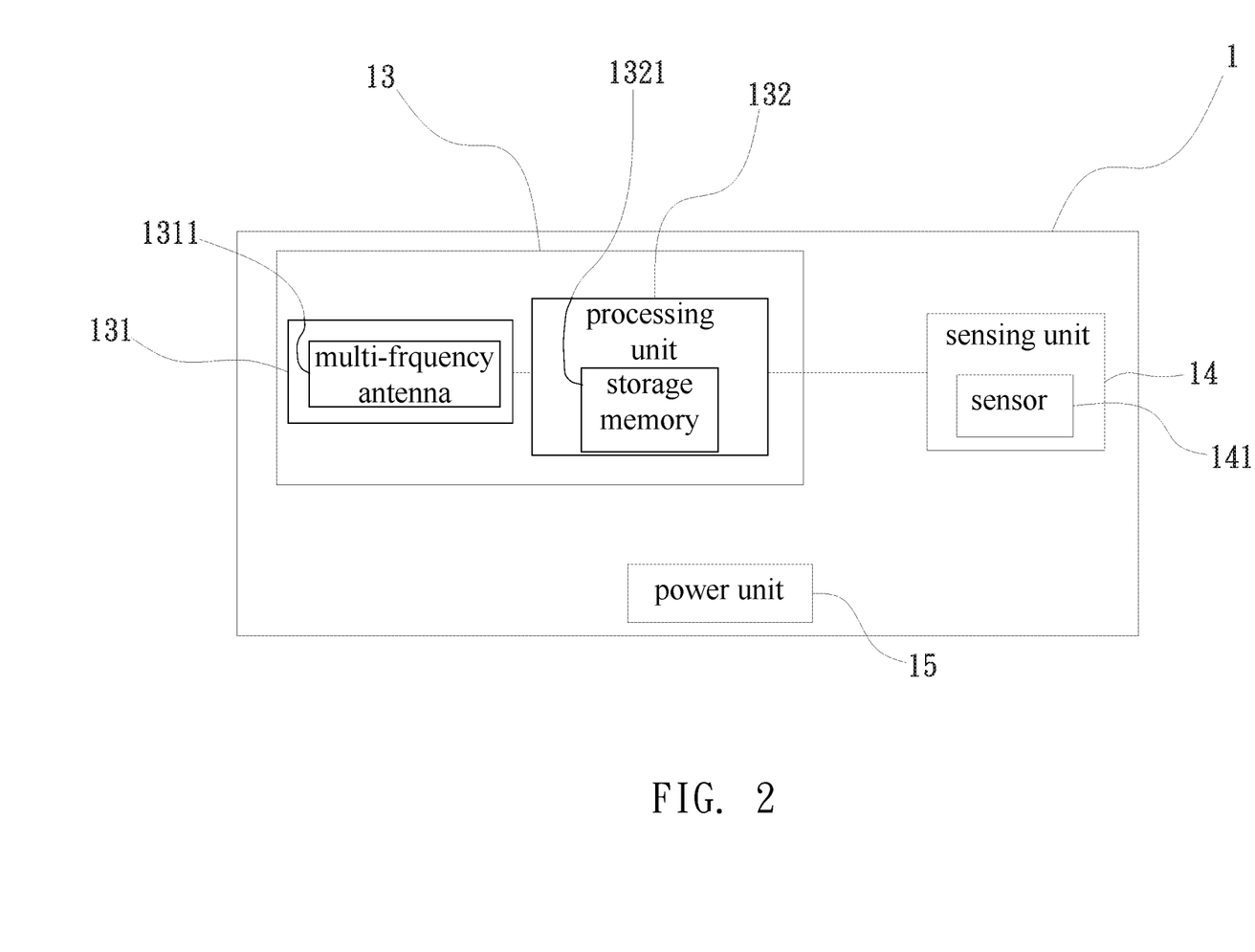
FIG. 2 is a block diagram of the structure for tire pressure monitoring according to an embodiment of the present invention.
Figure 3:
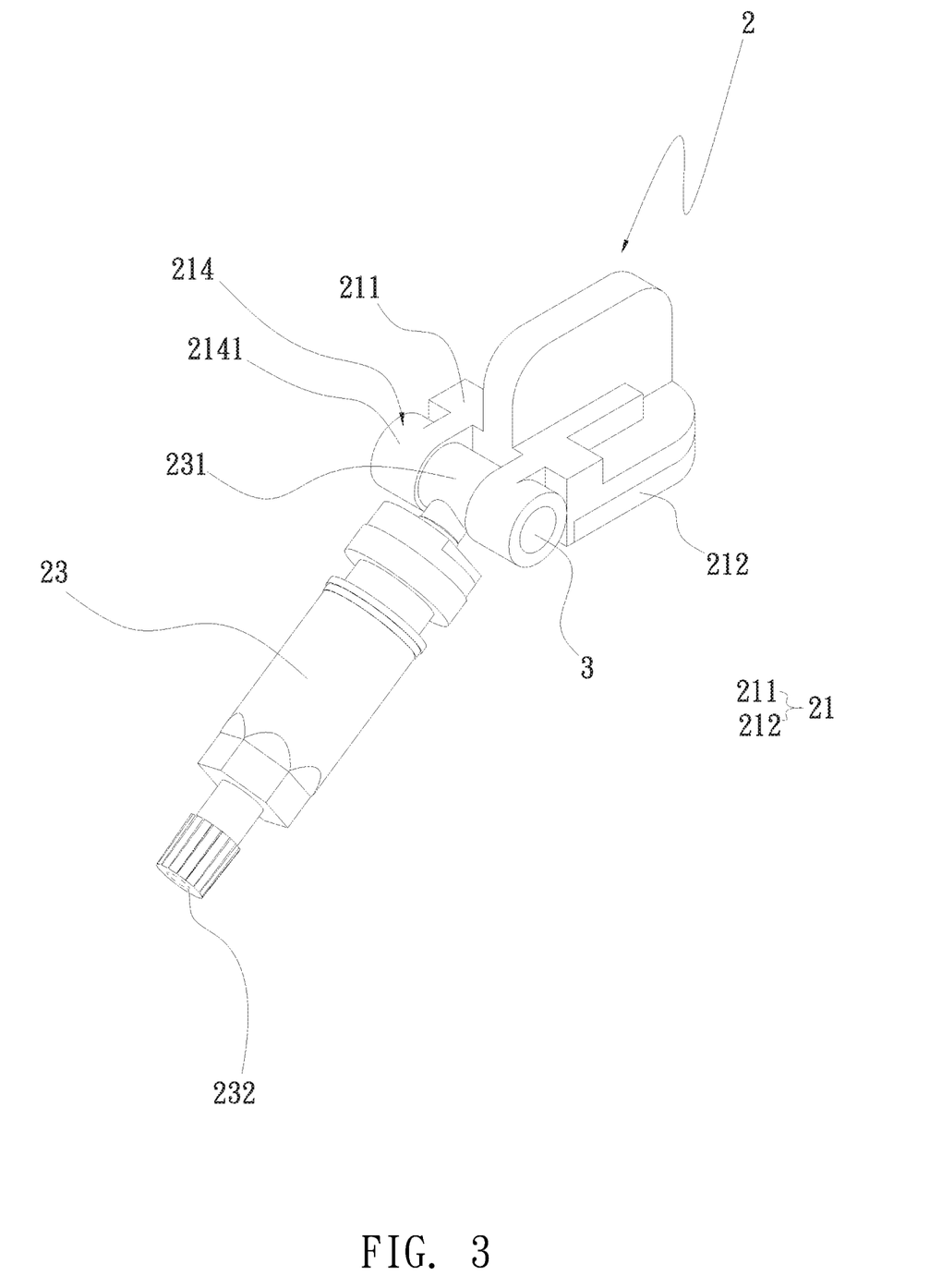
FIG. 3 is a perspective assembled view of the apparatus for tire pressure monitoring according to an embodiment of the present invention.
Figure 3A:
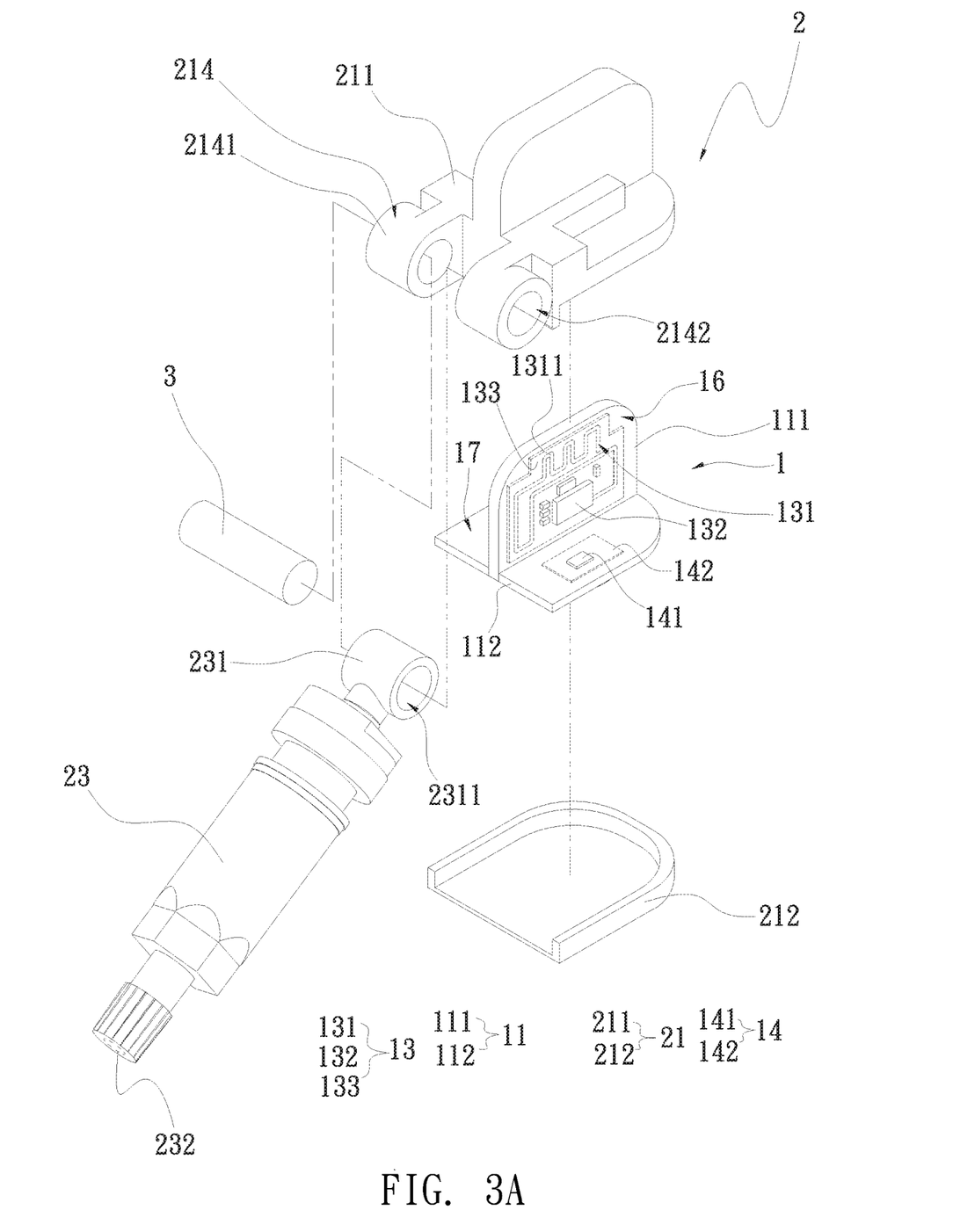
FIG. 3A is a perspective exploded view of the apparatus for tire pressure monitoring according to an embodiment of the present invention.
Figure 3B:
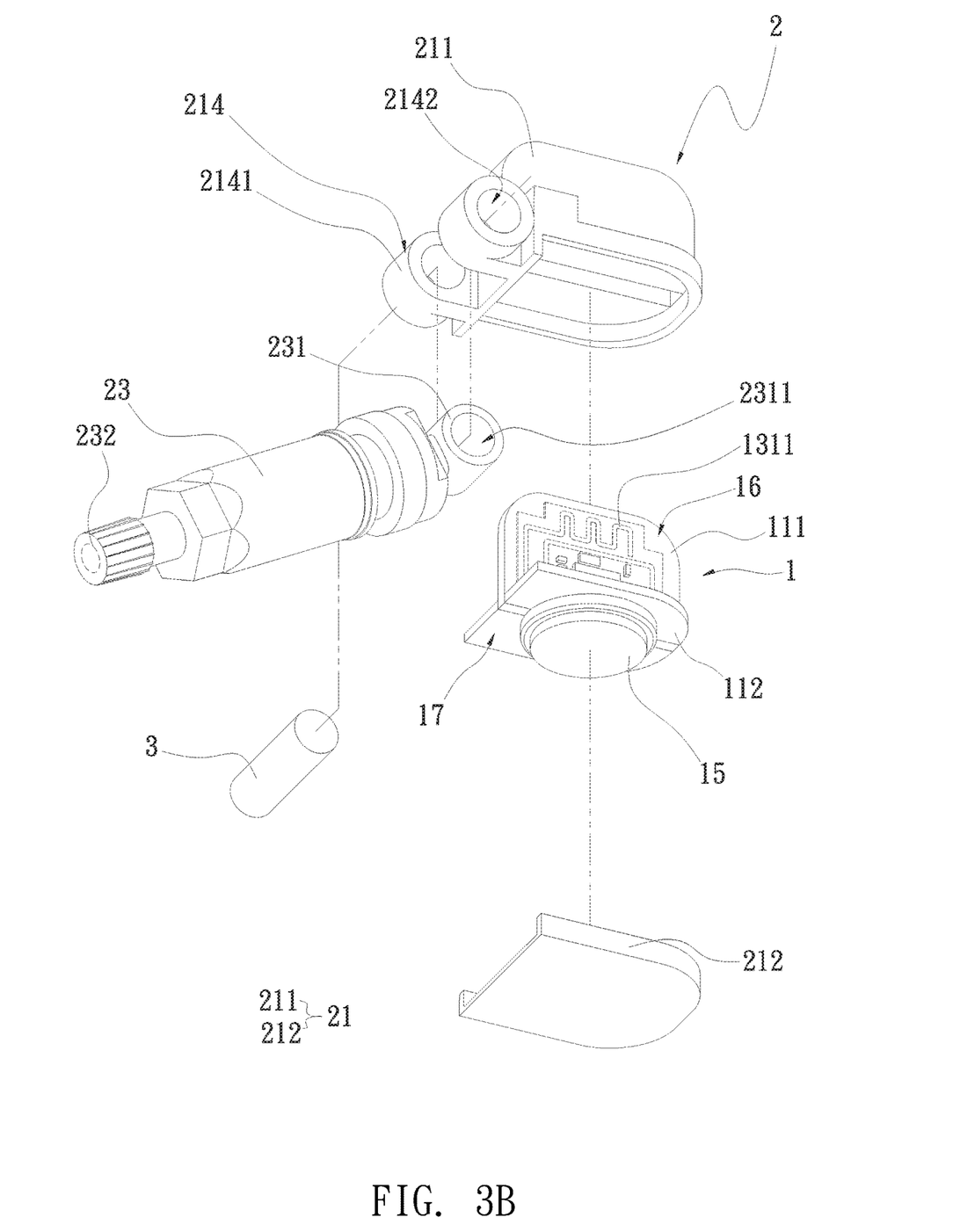
FIG. 3B is another perspective exploded view of the apparatus for tire pressure monitoring according to an embodiment of the present invention.

Moreover, the signal processing unit 13 is disposed at one side of the first part 111 of the main body 11. The signal processing unit 13 is provided with a wireless emitter 131, a processing unit 132 connected to the wireless emitter 131, and a first circuit board 133. The wireless emitter 131 and the processing unit 132 are disposed on one side of the first circuit board 133. The wireless emitter 131 is used to emit the multi-frequency wireless signal such as the RF wireless signal. The wireless emitter 131 is provided with a directional multi-frequency antenna 1311 which is formed on one side surface of the first circuit board 133 and is electrically connected to the processing unit 132. In the current embodiment, two specific frequencies at which the multi-frequency antenna 1311 operates are 315 MHz and 433 MHz, but not limited to these. In practice, the frequency operated by the multi-frequency antenna 1311 may be selected to be from 488 MHz to 868 MHz, or others. The processing unit 132 receives and converts the sensed signal like a pressure sensor from the sensor 141 of the sensing unit 14 to generate a tire signal such as the tire pressure, tire temperature, or tire rotating speed. Then, the processing unit 132 sends the tire signal to the display of the central host (not shown) through the multi-frequency antenna 1311 of the wireless emitter 131. The processing unit 132 has a storage memory 1321 such as a random access memory (RAM), a Flash RAM, a read only memory (ROM), or other device storing data to store data. In an embodiment, the storage memory 1321 can be designed as an independent component which is disposed on one side of the first circuit board 133 opposite to the processing unit 132 such that the storage memory 1321 is connected to the processing unit 132.

The sensing unit 14 is disposed on the top side of the second part 112 of the main body 11. The sensing unit 14 is provided with at least one sensor 141 and a second circuit board 142. The sensor 141 is disposed on one side of the second circuit board 12. The sensor 141 may be a pressure sensor, a temperature sensor, or a pressure-and-temperature sensor. In the current embodiment, the sensor 141 is a pressure sensor. The pressure sensor is used to sense the tire pressure value (or the tire pressure) of a car tire. The pressure sensor (i.e., the sensor 141) is connected to the processing unit 132 of the first circuit board 133 correspondingly using a signal cable. In an embodiment, the sensing unit 14 further comprises a temperature sensor connected to the processing unit 132; the temperature sensor is used to sense the temperature value (or the tire temperature) in the car tire. The temperature sensor is disposed on one side of the second circuit board 142. The temperature sensor and the pressure sensor are individually connected to the processing unit 132. The above-mentioned second circuit board 142 of the second part 112 is vertical to the first circuit board 133 of the first part 111. By contrast, the sensor 141 of the second circuit board 142 of the second part 112 and the wireless emitter 131 of the first circuit board 133 of the first part 111 are not on the same plane. The above-mentioned first circuit board 133 and second circuit board 142 are the printed circuit boards (PCBs) or flexible printed circuit boards (FPCBs).

In addition, the power unit 15 is a battery. The power unit 15 is disposed on the bottom side of the second part 112 corresponding to the sensing unit 14. The sensor 141 of the second part 112 is disposed above the power unit 15 of the second part 112. The sensor 141 and the power unit 15 are disposed parallel with each other. The power unit 15 is connected to the signal processing unit 13 and the sensing unit 14 to provide power for the signal processing unit 13 and the sensing unit 14. The wireless emitter 131 of the first part 111 is disposed vertically above the power unit 15. In this way, by means of the first circuit board 133 and the second circuit board 142 being disposed separately and vertically to each other, the power unit 15 is stacked with the second circuit board 142 of the second part 112, which not only the space can be effectively saved, but also the interference in the wireless signal (e.g., the tire signal) emitted from the multi-frequency antenna 1311 can be prevented. Besides, by means of the first part 111 of the main body 11 of the present invention being disposed at the center of the second part 112 (i.e., the first part 111 being disposed at the center of gravity of the second part 112 of the main body 11) and the signal processing unit 13, the sensing unit 14, and the power unit 15 being evenly disposed on the first part 111 and the second part 112 correspondingly, the structure 1 for tire pressure monitoring of the apparatus 2 for tire pressure monitoring has the effect of weight balance and further prevents the noise problem caused during the operation of the apparatus 2 for tire pressure monitoring installed on the wheel frame 4.

Figure 4A:
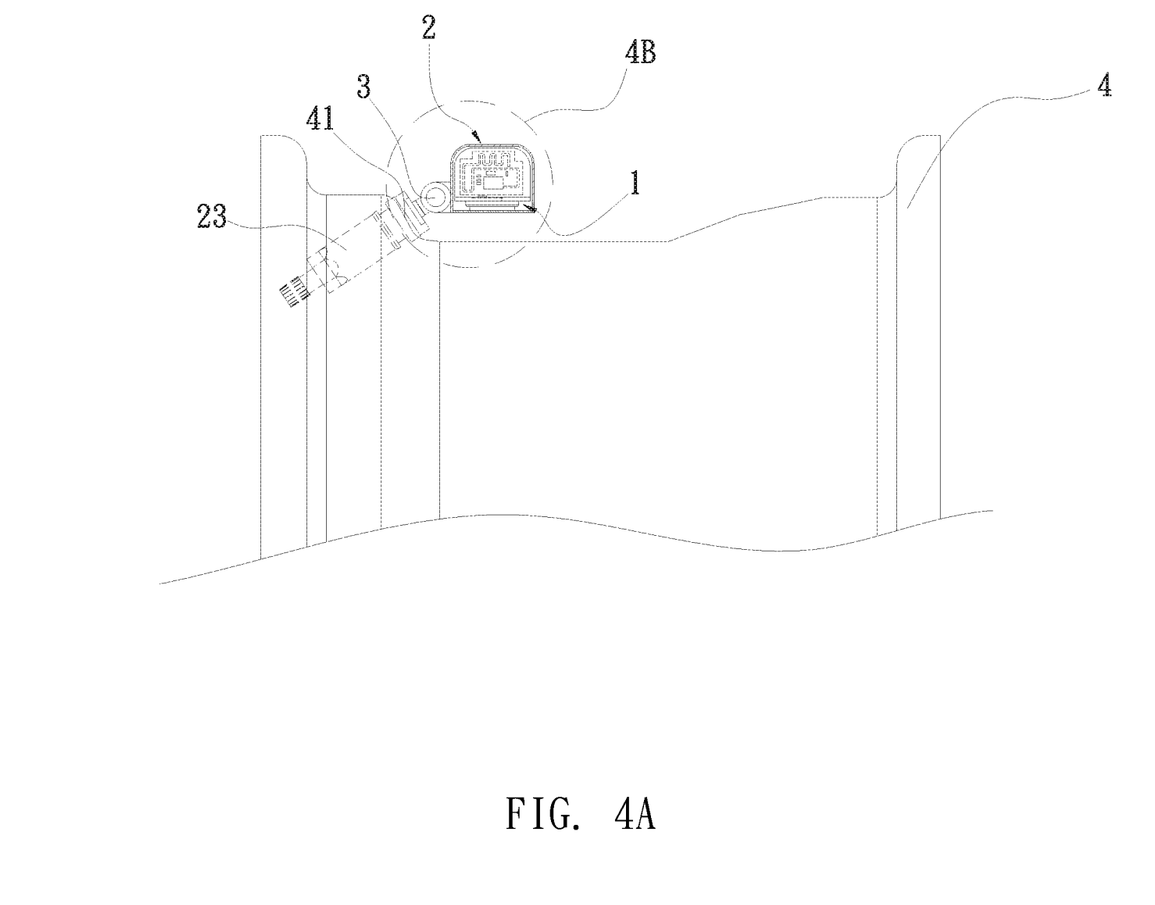
FIG. 4A is a schematic view of an embodiment of the present invention in practice.
Figure 4B:
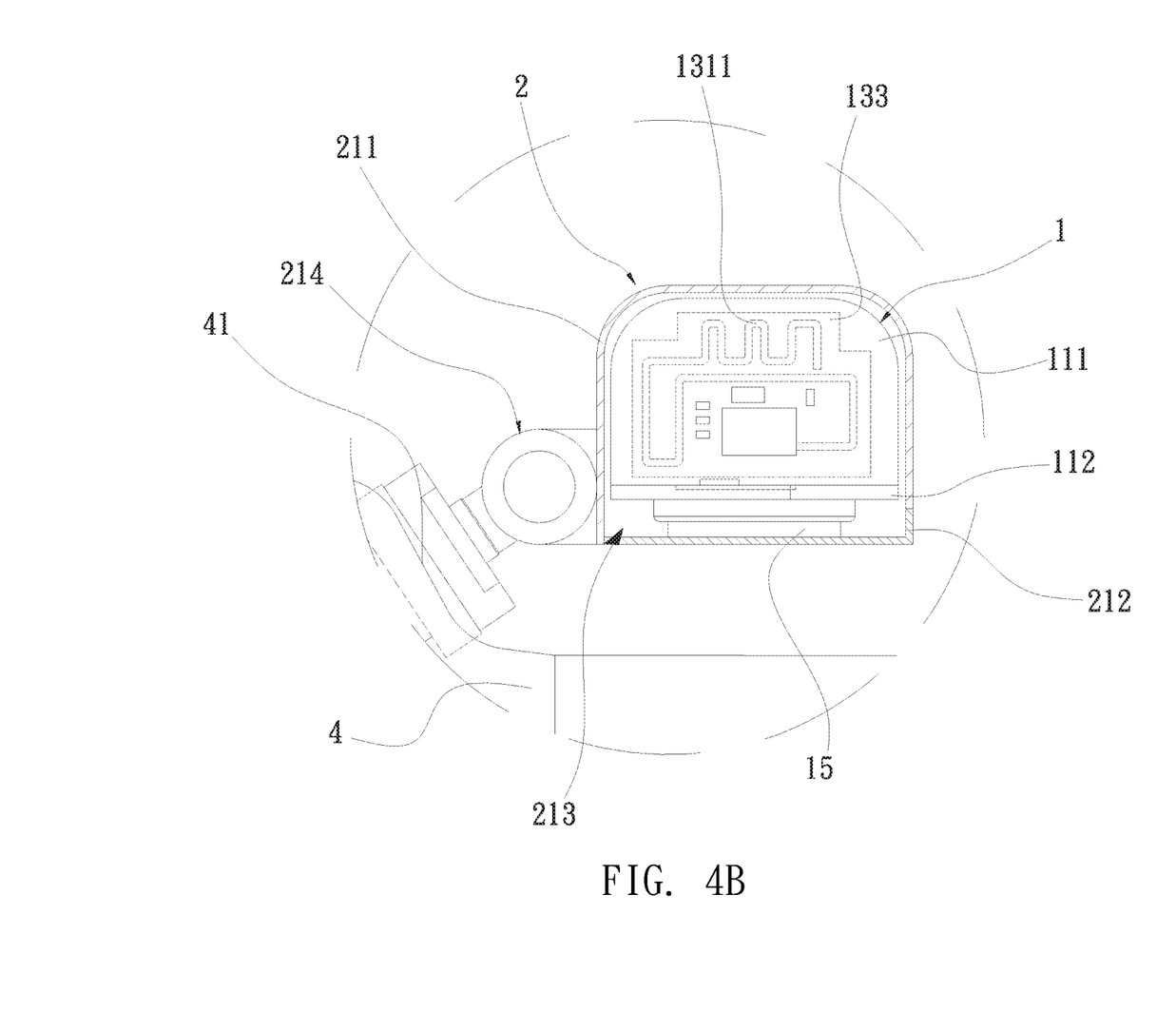
FIG. 4B is a local enlarged view of FIG. 4A.

Please refer to FIGS. 1B, 4A, and 4B. The apparatus 2 for tire pressure monitoring further comprises a first encapsulant 16 and a second encapsulant 17. The first encapsulant 16 covers the first circuit board 133 of the first part 111 and the multi-frequency antenna 1311 of the wireless emitter 131. The processing unit 132 of the first circuit board 133 is exposed out of the first encapsulant 16. The second encapsulant 17 covers the second circuit board 142 of the second part 112. The sensor 141 of the second circuit board 142 is exposed out of the second encapsulant 17. In this way, the first circuit board 133 and the second circuit board 142 are coved by the first encapsulant 16 and the second encapsulant 17, respectively, such that the first circuit board 133, the multi-frequency antenna 1311 thereon, and the second circuit board 142 are not prone to the penetration and damage by foreign bodies (e.g., moisture or salt spray), which produces the protection effect to effectively extend the lifetime of the apparatus 2 for tire pressure monitoring.

Also, the gas nozzle unit 23 is combined with the wheel frame 4 correspondingly. The wheel frame 4 has a hole 41 through which the other end of the gas nozzle unit 23 is disposed. The case 21 is disposed above the interior of the wheel frame 4. The sensor 141 of the second part 112 of the main body 11 is parallel with the bottom of the interior of the wheel frame 4.

When the apparatus 2 for tire pressure monitoring is installed on the wheel frame 4, the multi-frequency antenna 1311 and the sensor 141 are both directional and thus the sensing direction of the sensor 141 and the emitting direction of the multi-frequency antenna 1311 are separate from each other by means of the design of the multi-frequency antenna 1311 of the first part 111 of the main body 11 and the sensor 141 of the second part 112 being not on the same plane. Then, the case 21 is adjusted to move (e.g., upwards) about one end of the gas nozzle unit 23 through the pivot pin 3. By contrast, the relative angle between the multi-frequency antenna 1311 in the case 21 and the wheel frame 4 changes accordingly to further move the multi-frequency antenna 1311 away from the wheel frame 4 to effectively prevent the interference from the wheel frame 4. At this time, the sensor 41 on the second part 112 of the adjusted and moved case 21 is not affected and can keep the original sensing direction. Therefore, the emitting direction of the multi-frequency antenna 1311 can point to the central host in the car for signal emission through the adjustment and movement of the case 21 to achieve the effect of good and stable signal reception quality.

Thus, by means of the designs of the structure 1 for tire pressure monitoring of the present invention and the apparatus 2 for tire pressure monitoring comprising the case 21 and the gas nozzle unit 23, the occupied space can be effectively saved, the wireless emitter 131 is away from the interference from the wheel frame 4, and the signal reception quality between the wireless emitter 131 and the central host in the car can remain stable.

What is claimed is:

1. A structure for tire pressure monitoring, comprising:
a main body having a first part and a second part, wherein the first part is disposed on a top side of the second part, wherein the first part and the second part are not on the same plane;
a signal processing unit disposed at one side of the first part of the main body, wherein the signal processing unit is provided with a wireless emitter, a processing unit connected to the wireless emitter, and a first circuit board, wherein the wireless emitter and the processing unit are disposed on one side of the first circuit board;

a sensing unit disposed on the top side of the second part of the main body, wherein the sensing unit is provided with at least one sensor and a second circuit board, wherein the at least one sensor is disposed on one side of the second circuit board and connected to the processing unit disposed on the first circuit board; and a power unit disposed on a bottom side of the second part corresponding to the sensing unit, wherein the power unit is connected to the signal processing unit and the sensing unit to provide power.

2. The structure for tire pressure monitoring according to claim 1, further comprising a first encapsulant and a second encapsulant, wherein the first encapsulant covers the first circuit board of the first part and the wireless emitter, wherein the processing unit of the first circuit board is exposed out of the first encapsulant, wherein the second encapsulant covers the second circuit board of the second part, wherein the at least one sensor of the second circuit board is exposed out of the second encapsulant.

3. The structure for tire pressure monitoring according to claim 1, wherein the first part is disposed vertically at the center of the upper side of the second part, wherein the first circuit board of the first part is vertical to the second circuit board of the second part, wherein the wireless emitter and the at least one sensor are not on the same plane.

4. The structure for tire pressure monitoring according to claim 1, wherein the power unit is a battery, wherein the at least one sensor of the second part is disposed above the power unit of the second part, wherein the at least one sensor and the power unit are disposed parallel with each other, wherein the wireless emitter is disposed vertically above the power unit.

5. The structure for tire pressure monitoring according to claim 1, wherein the at least one sensor is a pressure sensor, a temperature, or a pressure-temperature sensor.

6. An apparatus for tire pressure monitor, comprising:
a case having a receiving space and a connecting part, wherein the connecting part is disposed on an outside of the case;
a gas nozzle unit having one end thereof movably connected to the connecting part; and
a structure for tire pressure monitoring, disposed in the receiving space, comprising:
  a main body having a first part and a second part, wherein the first part is disposed on an upper side of the second part, wherein the first part and the second part are not on the same plane;
  a signal processing unit disposed at one side of the first part of the main body, wherein the signal processing unit is provided with a wireless emitter, a processing unit connected to the wireless emitter, and a first circuit board, wherein the wireless emitter and the processing unit are disposed on one side of the first circuit board;
  a sensing unit disposed on the top side of the second part of the main body, wherein the sensing unit is provided with at least one sensor and a second circuit board, wherein the at least one sensor is disposed on one side of the second circuit board and connected to the processing unit disposed on the first circuit board; and
  a power unit disposed on a bottom side of the second part corresponding to the sensing unit, wherein the power unit is connected to the signal processing unit and the sensing unit to provide power.

7. The apparatus for tire pressure monitor according to claim 6, wherein the case is provided with a top cover and a base, wherein the top cover is combined with the base, wherein the top cover and the base together define the receiving space, the connecting part has two lugs opposite to each other, wherein the two lugs are formed on the outside of the top cover, wherein each of the two lugs has a throughhole, wherein the gas nozzle unit has a joining part disposed between the two lugs, wherein the one end of the gas nozzle unit protrudes outwards to form the joining part, wherein the joining part is provided with an opening corresponding to the throughholes and is disposed by means of a pivot pin passing through the throughholes and the opening.

8. The apparatus for tire pressure monitor according to claim 6, further comprising a first encapsulant and a second encapsulant, wherein the first encapsulant covers the first circuit board of the first part and the wireless emitter, wherein the processing unit of the first circuit board is exposed out of the first encapsulant, wherein the second encapsulant covers the second circuit board of the second part, wherein the at least one sensor of the second circuit board is exposed out of the second encapsulant.

9. The apparatus for tire pressure monitor according to claim 6, wherein the first part is disposed vertically at the center of the upper side of the second part, wherein the first circuit board of the first part is vertical to the second circuit board of the second part, wherein the wireless emitter and the at least one sensor are not on the same plane.

10. The apparatus for tire pressure monitor according to claim 6, wherein the power unit is a battery, wherein the at least one sensor of the second part is disposed above the power unit of the second part, wherein the at least one sensor and the power unit are disposed parallel with each other, wherein the wireless emitter is disposed vertically above the power unit.

11. The apparatus for tire pressure monitor according to claim 6, wherein the at least one sensor is a pressure sensor, a temperature, or a pressure-temperature sensor.

12. The apparatus for tire pressure monitor according to claim 6, wherein the gas nozzle unit is combined with a wheel frame correspondingly, wherein the wheel frame has a hole through which the other end of the gas nozzle unit is disposed, wherein the main body is disposed above the interior of the wheel frame, wherein the at least one sensor of the second part is parallel with the bottom of the interior of the wheel frame.

* * * * *